(12) United States Patent
Farkas et al.

(10) Patent No.: US 9,231,749 B2
(45) Date of Patent: Jan. 5, 2016

(54) METHODS, SYSTEMS, AND COMPUTER PROGRAM PRODUCTS FOR DETERMINING A RADIO NETWORK TEMPORARY IDENTIFIER AND CODING RATE FOR AN INTERCELL SIGNAL IN A LONG TERM EVOLUTION COMMUNICATIONS NETWORK

(71) Applicant: Collision Communications, Inc., Peterborough, NH (US)

(72) Inventors: Joseph Farkas, Merrimack, NH (US); Sayak Bose, Nashua, NH (US); Seyedmehdi S. Nokhodberiz, Nashua, NH (US)

(73) Assignee: Collision Communications, Inc., Peterborough, NH (US)

( * ) Notice: Subject to any disclaimer, the term of this patent is extended or adjusted under 35 U.S.C. 154(b) by 0 days.

(21) Appl. No.: 14/261,784

(22) Filed: Apr. 25, 2014

(65) Prior Publication Data

US 2015/0312016 A1   Oct. 29, 2015

(51) Int. Cl.
*H04W 76/02* (2009.01)
*H04L 5/00* (2006.01)

(52) U.S. Cl.
CPC .............. *H04L 5/0073* (2013.01); *H04L 5/006* (2013.01); *H04L 5/0048* (2013.01)

(58) Field of Classification Search
CPC ........... H04W 76/028; H04W 74/0833; H04L 27/345; H04L 27/362; H04L 25/03834; H04N 21/236; G06F 11/1076; G11C 11/406
USPC .................... 455/450; 370/335; 375/347, 265
See application file for complete search history.

(56) References Cited

U.S. PATENT DOCUMENTS

| | | |
|---|---|---|
| 2007/0177697 A1* | 8/2007 | Calderbank et al. .......... 375/347 |
| 2009/0238149 A1* | 9/2009 | Kawabata ..................... 370/335 |
| 2011/0280287 A1 | 11/2011 | Cheng et al. |
| 2013/0039285 A1 | 2/2013 | Sorrentino |
| 2014/0128078 A1 | 5/2014 | Zhu |
| 2014/0247799 A1 | 9/2014 | Suzuki |
| 2015/0139004 A1 | 5/2015 | Fodor et al. |

OTHER PUBLICATIONS

LTE; Evolved Universal Terrestrial Radio Access (E-UTRA); Physical Channels and Modulation (3GPP TS 36.211 version 10.0.0 Release 10), ETSI Technical Specification, ETSI TS 136 211 v. 10.0.0 (Jan. 2011), 105 pages.

* cited by examiner

*Primary Examiner* — Phuoc H Doan (57) ABSTRACT

Methods and systems are described for determining a radio network temporary identifier (RNTI) and coding rate for an intercell signal in an LTE network. In one aspect, a plurality of potential RNTIs (that is a subset of all available RNTIs) associated with a received intercell signal is determined. A first signal based on a first potential combination of a one of the plurality of RNTIs and a coding rate is processed by a first decoder. Whether the first potential combination includes a correct RNTI and coding rate combination for the received intercell signal is determined based on at least one metric for the processed first signal. A second signal based on a second potential combination of a one of the plurality of RNTIs and a coding rate is processed by a second decoder if the first potential combination does not include the correct RNTI and coding rate combination.

28 Claims, 4 Drawing Sheets

METHODS, SYSTEMS, AND COMPUTER PROGRAM PRODUCTS FOR DETERMINING A RADIO NETWORK TEMPORARY IDENTIFIER AND CODING RATE FOR AN INTERCELL SIGNAL IN A LONG TERM EVOLUTION COMMUNICATIONS NETWORK

RELATED APPLICATIONS

This application is related to U.S. application Ser. No. 14/261,772, titled "Methods, Systems, And Computer Program Products For Determining A Demodulation Reference Sequence For An Intercell Interfering Signal Received From A Mobile Device In A Long Term Evolution Communication System", filed on even date herewith, the entire disclosure of which is here incorporated by reference.

BACKGROUND

Intercell interference is a common problem in cellular communication systems. For example, in a Long Term Evolution (LTE) network, mobile devices in other cells cause intercell interference by transmitting on the LTE uplink at the same time and frequency. Intercell interference is partially mitigated by spatially combining multiple receive antennas. Since direct knowledge of the interfering signals is not known, these spatial techniques rely on techniques that do not model the interference directly. Modeling the interference directly can yield a significant improvement in suppressing intercell interference.

One method of suppressing intercell interference is to explicitly have knowledge of the transmit parameters of the intercell users and thereby have knowledge of a reference signal in the interfering transmission. With this knowledge, multi-user parameter estimation and multi-user detection algorithms can jointly model the intracell and intercell users, providing significant improvement in intercell interference rejection.

Conventional methods for directly modelling intercell signals requires the explicit sharing of all information so that the transmit parameters for an interfering signal are known ahead of time. However, explicitly sharing this much information requires a high throughput, low latency link between cells, making it impractical and too expensive to deploy in many cases.

Accordingly, there exists a need for improved methods, systems, and computer program products for determining a radio network temporary identifier (RNTI) and coding rate for an intercell signal in an LTE communications network.

SUMMARY

Methods and systems are described for determining an RNTI and coding rate for an intercell signal in an LTE network. In one aspect, a plurality of potential RNTIs (that is a subset of all available RNTIs) associated with a received intercell signal is determined. A first signal based on a first potential combination of a one of the plurality of RNTIs and a coding rate is processed by a first decoder. Whether the first potential combination includes a correct RNTI and coding rate combination for the received intercell signal is determined based on at least one metric for the processed first signal. A second signal based on a second potential combination of a one of the plurality of RNTIs and a coding rate is processed by a second decoder if the first potential combination does not include the correct RNTI and coding rate combination.

BRIEF DESCRIPTION OF THE DRAWINGS

Advantages of the claimed invention will become apparent to those skilled in the art upon reading this description in conjunction with the accompanying drawings, in which like reference numerals have been used to designate like or analogous elements, and in which:

DETAILED DESCRIPTION

Figure 1:
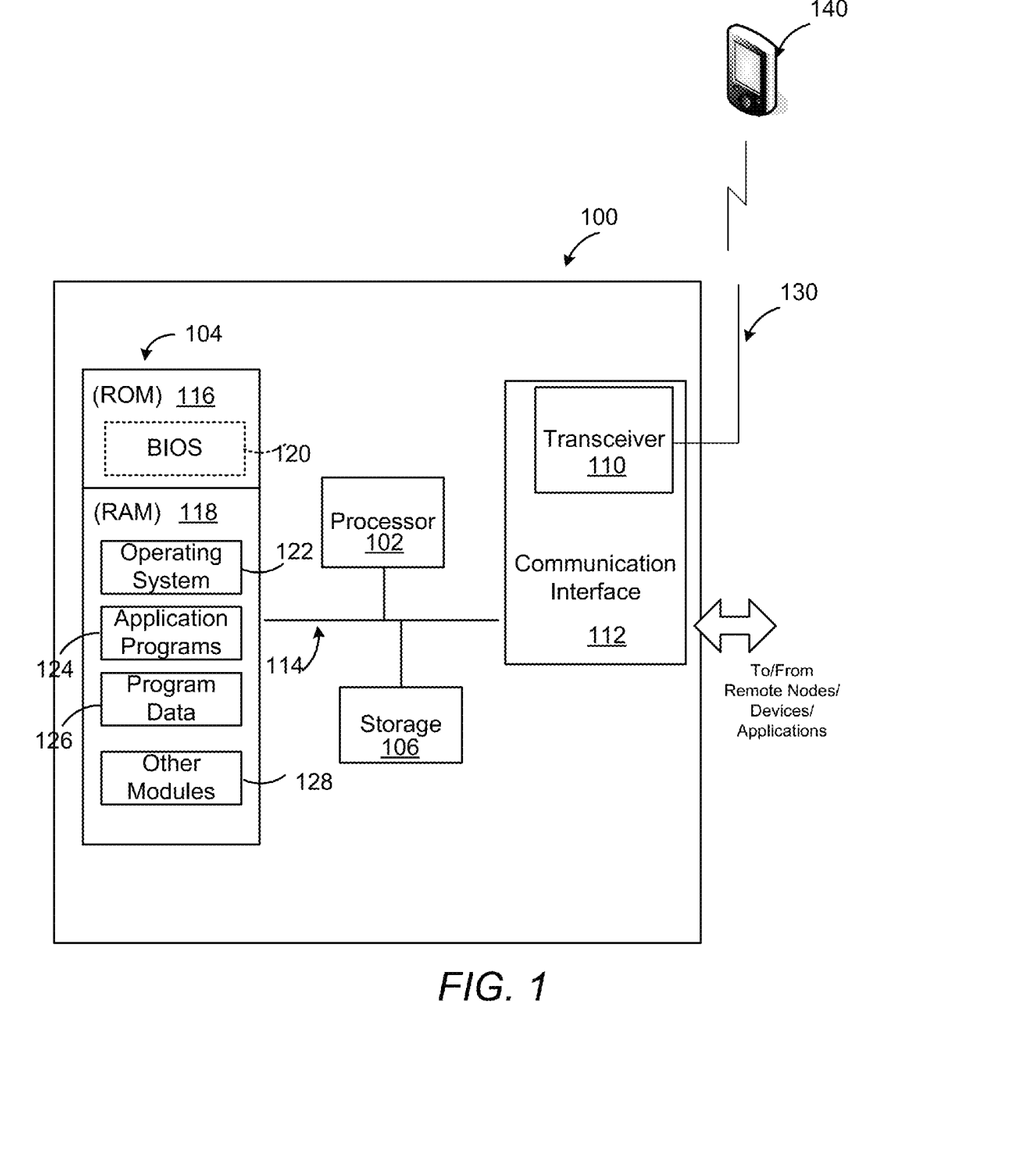
FIG. 1 is a block diagram illustrating an exemplary hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, transceiver 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100. It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128.

The hardware device 100 may be part of a base station (not shown) configured to communicate with mobile devices 140 in a communication network. A base station may also be referred to as an eNodeB, an access point, and the like. A base station typically provides communication coverage for a particular geographic area. A base station and/or base station subsystem may cover a particular geographic coverage area referred to by the term "cell." A network controller (not shown) may be communicatively connected to base stations and provide coordination and control for the base stations. Multiple base stations may communicate with one another, e.g., directly or indirectly via a wireless backhaul or wireline backhaul.

The hardware device 100 may operate in a networked environment using logical connections to one or more remote nodes via communication interface 112, including communicating with one or more mobile devices 140 via a transceiver 110 connected to an antenna 130. The mobile devices 140 can be dispersed throughout the network 100. A mobile device may be referred to as user equipment (UE), a terminal, a mobile station, a subscriber unit, or the like. A mobile device may be a cellular phone, a personal digital assistant (PDA), a wireless modem, a wireless communication device, a handheld device, a laptop computer, a wireless local loop (WLL) station, a tablet computer, or the like. A mobile device may communicate with a base station directly, or indirectly via other network equipment such as, but not limited to, a pico eNodeB, a femto eNodeB, a relay, or the like.

The remote node may be a computer, a server, a router, a peer device or other common network node, and typically includes many or all of the elements described above relative to the hardware device 100. The communication interface 112, including transceiver 110 may interface with a wireless network and/or a wired network. For example, wireless communications networks can include, but are not limited to, Code Division Multiple Access (CDMA), Time Division Multiple Access (TDMA), Frequency Division Multiple Access (FDMA), Orthogonal Frequency Division Multiple Access (OFDMA), and Single-Carrier Frequency Division Multiple Access (SC-FDMA). A CDMA network may implement a radio technology such as Universal Terrestrial Radio Access (UTRA), Telecommunications Industry Association's (TIA's) CDMA2000, and the like. The UTRA technology includes Wideband CDMA (WCDMA), and other variants of CDMA. The CDMA2000® technology includes the IS-2000, IS-95, and IS-856 standards from The Electronics Industry Alliance (EIA), and TIA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advance (LTE-A) are newer releases of the UMTS that use E-UTRA. UTRA, E-UTRA, UMTS, LTE, LTE-A, and GAM are described in documents from an organization called the "3rd Generation Partnership Project" (3GPP). CDMA2000® and UMB are described in documents from an organization called the "3rd Generation Partnership Project 2" (3GPP2). The techniques described herein are primarily focused on LTE and LTE-A networks, but analogously may be used for any of the wireless networks and radio access technologies mentioned above, as well as other wireless networks and radio access technologies.

Other examples of wireless networks include, for example, a BLUETOOTH network, a wireless personal area network, and a wireless 802.11 local area network (LAN). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

In LTE networks, there are a number of RNTI types. RNTIs serve to identify information dedicated to a particular subscriber on the radio interface, since common channels and shared channels are used to transmit data across the radio interface. RNTIs can also be used to distinguish broadcast network information from data streams of subscribers. Generally speaking, RNTIs are used to scramble radio channel messages, such that without the RNTI, an associated radio channel message cannot be decoded. RNTIs are generally signaled in the Medium Access Control (MAC) layer.

Several RNTI types are briefly described herein. It should be understood that the general term "RNTI" is used herein to refer to any one or more of these RNTI types, or to another type provided for by the 3GPP standard.

A Cell Radio Network Temporary Identifier (C-RNTI), Temporary Cell Radio Network Temporary Identifier (temp C-RNTI), and Semi-Persistent Scheduling (SPS) C-RNTI is associated with the Dedicated Control Channel (DCCH) and DTCH. A Temporary C-RNTI, however, is associated with a Common Control Channel (CCCH) during the random access procedure. The C-RNTI defines unambiguously which data sent in a downlink direction within a particular LTE cell belongs to a particular subscriber. For instance, all RRC messages belonging to a single connection between a UE and the network are marked with the same C-RNTI value by the MAC entity that provided transport services to the RRC and NAS. The temp C-RNTI is allocated to the UE during random access procedure (with a RRC connection setup message) and may turn into a permanent C-RNTI depending on the result of a subsequently performed contention resolution procedure or in the case of contention-free random access. The SPS C-RNTI is used if the subscriber is running services with a predictable unchanging Quality of Service (QoS) profile. The SPS C-RNTI is used to indicate an area of resource blocks that will be used by the same UE for a longer time frame without any expected change. The C-RNTI format and encoding are specified in 3GPP 36.321.

A Transmit Power Control (TPC) command is included on a PDCCH whose cyclic redundancy check (CRC) parity bits are scrambled with TPC-PUSCH-RNTI. A TPC command is also sent jointly coded with other UE specific PUCCH correction values on a PDCCH whose CRC parity bits are scrambled with TPC-PUCCH-RNTI.

A Random Access Radio Network Temporary Identifier (RA-RNTI) is associated with DL-SCH. The RA-RNTI is assigned by the eNodeB to a particular UE after this UE has sent a random access preamble on the Physical Random Access Channel (PRACH). If this random access preamble is received by the eNodeB and network access granted, the base station sends an acquisition indication back to the mobile and this acquisition indication message contains the RA-RNTI. In turn the UE will use the RA-RNTI to send a Radio Resource Controller (RRC) connection request message on the radio interface uplink and the parameter will help to distinguish messages sent by different UEs on the Random Access Channel (RACH).

A Paging Radio Network Temporary Identity (P-RNTI) is associated with a Paging Control Channel (PCCH). The P-RNTI does not refer to a particular UE, but to a group of UEs. The P-RNTI is derived from the IMSI of the subscriber to be paged and constructed by the eNodeB. The SI-RNTI is sent on the PDCCH signals to all mobiles in a cell where the broadcast System Information Blocks (SIBs) are found on the Physical Downlink Shared Channel (PDSCH). This is necessary since the PDSCH is used to transport both broadcast system information for all UEs and signaling/payload for particular mobiles.

A System Information Radio Network Temporary Identifier (SI-RNTI) is associated with a Broadcast Control Channel (BCCH). If a UE is configured to decode PDCCH with CRC scrambled by an SI-RNTI, the UE decodes the PDCCH and the corresponding PDSCH according to any of the combinations defined in table 7.1-1. The scrambling initialization of PDSCH corresponding to these PDCCHs is by SI-RNTI.

All RNTIs are encoded using the same 16-bit format. Accordingly, there are $2^{16}$, i.e., 65,536, possible values that can be used for RNTIs. Table 1 below, from the 3GPP specification (3GPP 36.321), provides value ranges for values that may be assigned for different types of RNTI.

TABLE 1

| Value (hexadecimal) | RNTI |
|---|---|
| 0000 | N/A |
| 0001-003C | RA-RNTI, C-RNTI, SPS C-RNTI, temporary C-RNTI, TPC-PUCCH-RNTI, and |

TABLE 1-continued

| Value (hexadecimal) | RNTI |
| --- | --- |
|  | TPC-PUSCH-RNTI |
| 003D-FFF3 | C-RNTI, SPS C-RNTI, temporary C-RNTI, TPC-PUCCH-RNTI, and TPC-PUSCH-RNTI |
| FFF4-FFFC | Reserved for future use |
| FFFD | M-RNTI |
| FFFE | P-RNTI |
| FFFF | SI-RNTI |

Figure 4:
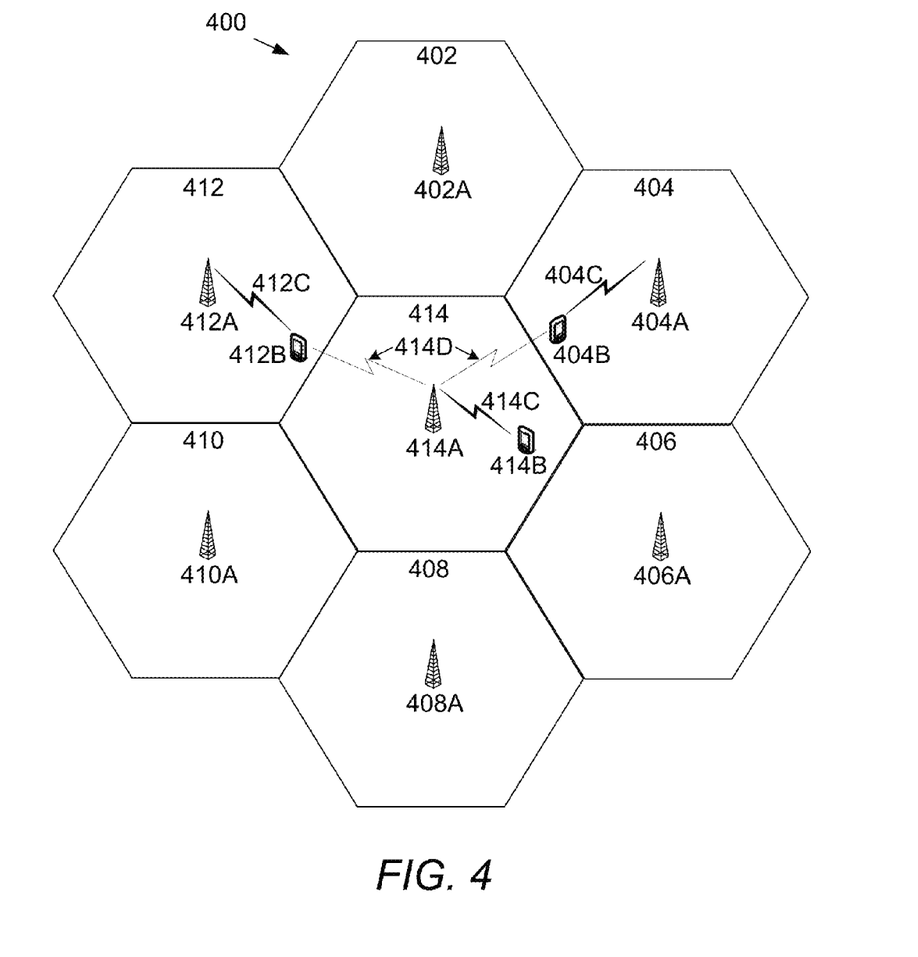
FIG. 4 is a diagram illustrating communications in an LTE system.

FIG. 4 illustrates a typical scenario of a deployed cellular network, such as an LTE cellular network or an LTE-A cellular network. In FIG. 4, cells 402-414 comprise a portion 400 of the cellular network. Each cell 402-414 includes a respective base station 402A-414A. Mobile devices 404B, 412B, and 414B are in communication (or attempting communication) respectively with base stations 404A, 412A, and 414A via communication links 404C, 412C, and 414C. As can be appreciated from the diagram, cells 404 and 412 both border cell 414. Mobile devices 404B and 412B, due to their proximity to base station 414A, are seen as intercell interference 4140 at base station 414A. Accordingly, it is advantageous for a receiver at base station 414A to be able to determine an RNTI and coding rate for each of the intercell signals 4140. Once an RNTI and coding rate is known, all transmit parameters can be determined and the intercell signals 4140 can be fully decoded for the mobile devices 404B and 412B such that any number of options are available, such as interference cancellation or multi-user detection.

Figure 2:
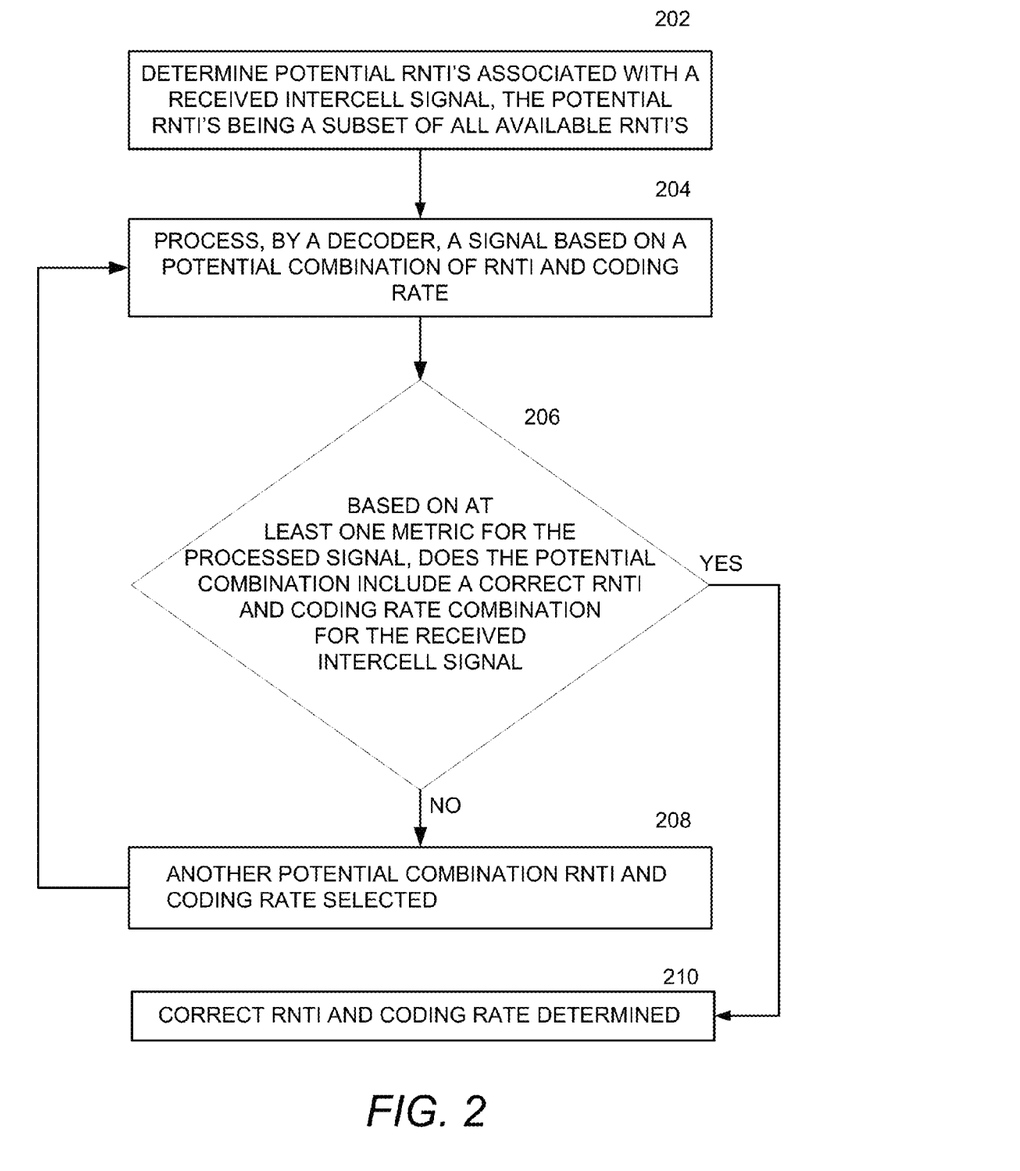
FIG. 2 is a flow diagram illustrating a method for determining an RNTI and coding rate for an intercell signal in an LTE communications network according to an aspect of the subject matter described herein.
Figure 3:
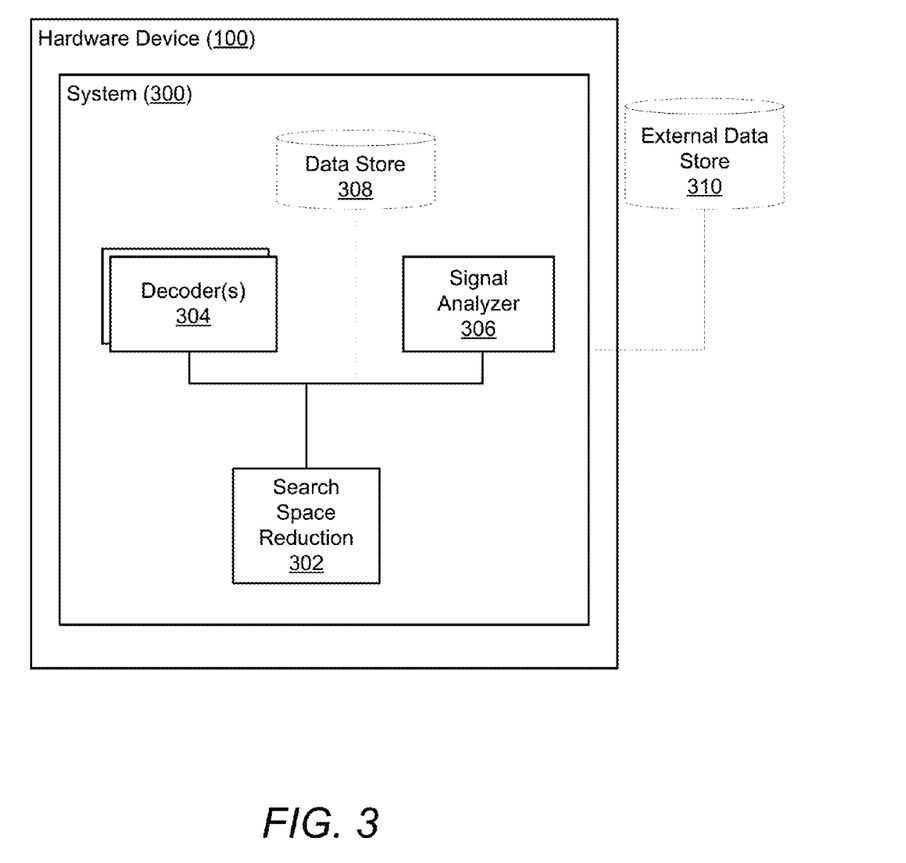
FIG. 3 is a block diagram illustrating an arrangement of components for determining an RNTI and coding rate for an intercell signal in an LTE communications network according to another aspect of the subject matter described herein.

Turning now to FIGS. 2 and 3, a flow diagram is shown in FIG. 2 illustrating a method for determining an RNTI and coding rate for an intercell signal in an LTE communications network according to an exemplary aspect of the subject matter described herein. FIG. 3 is a block diagram illustrating an arrangement of components for determining an RNTI and coding rate for an intercell signal in an LTE communications network according to another exemplary aspect of the subject matter described herein. FIG. 1 is a block diagram illustrating an arrangement of components providing an execution environment configured for hosting the arrangement of components depicted in FIG. 3. The method in FIG. 2 can be carried out by, for example, some or all of the components illustrated in the exemplary arrangement in FIG. 3 operating in an a compatible execution environment, such as the environment provided by some or all of the components of the arrangement in FIG. 1. The arrangement of components in FIG. 1 may be implemented by some or all of the components of the hardware device 100 of FIG. 1.

With reference to FIG. 2, in block 202 a set of potential RNTIs associated with a received intercell signal is determined, the set of potential RNTIs being a subset of all available RNTIs. Accordingly, a system for determining an RNTI and coding rate for an intercell signal in an LTE communications network includes means for determining a set of potential RNTIs associated with a received intercell signal. For example, as illustrated in FIG. 3, a Search Space Reduction (SSR) component 302 can be configured to determine a set of potential RNTIs associated with a received intercell signal.

As discussed above, there are approximately $2^{16}$ possible RNTI values. Assuming other transmit parameters such as modulation and bandwidth allocation, the number of potential coding rates are reduced to a fairly small number. The number of potential coding rates are either 11, 10, or 8, depending on if the modulation is QPSK, 16-QAM, or 64-QAM. Therefore without reducing the search space, there may be up to $11*2^{16}=720,896$ possible combinations of RNTI and coding rate to attempt to decode, which requires a prohibitively high number of operations if each of these combinations are to be processed to determine which combination is the correct one. Accordingly, it is important to reduce the search space to limit the number of operations required to correctly determine the RNTI and coding rate so that, for example, the intercell signal is properly decoded for use in interference cancellation and/or multiuser detection.

In one aspect, the search space can be reduced to include the set of RNTIs for mobile devices that are transmitting or requesting bandwidth allocation. For example, the SSR component 302 can be configured to determine the set of RNTIs for mobile devices that are transmitting or requesting bandwidth allocation. In example, an updating list of mobile devices that are transmitting, requesting bandwidth allocation, or a list of both can be stored in local data store 308 and/or external data store 310 and accessed by SSR component 302. The information used to update the local data store 308 and/or the external data store 310 can be provided by various nodes on the communication network, such as other base stations.

In another aspect, determining a set of RNTIs for mobile devices that are transmitting or requesting bandwidth allocation includes determining the set of RNTIs for mobile devices that are transmitting to or requesting bandwidth allocation from at least one other base station serving a different cell. For example, the SSR component 302 can be configured to determine the set of RNTIs for mobile devices that are transmitting to or requesting bandwidth allocation from at least one other base station serving a different cell, such as an adjacent cell. The information can be received by communication interface 112 via a wireless or wired medium. For example, system 300 can be part of a base station that is linked to other base stations via fiber-optic link or other wiring and/or a wireless connection, over which information for determining a set of RNTIs is received and/or transmitted.

In another aspect, the set of potential RNTIs can be a preassigned set of potential RNTIs and/or a sequentially assigned set of potential RNTIs. For example, the SSR component 302 can be configured to determine a set of potential RNTIs associated with a received intercell signal by determining a preassigned set of potential RNTIs and/or a sequentially assigned set of potential RNTIs. For example, a particular scheme for RNTI values can be predetermined. The predetermined scheme and/or the preassigned values can be stored in, for example, data store 308 and/or external data store 310. One example of a scheme can be to start at a particular number, such as 1024 (0400 Hex), and sequentially assign RNTI values. Another exemplary scheme can be to assign a block of RNTI values according to which base station the mobile device associated with the RNTI value is communicating with. Within these individual blocks, RNTI values can be assigned sequentially. For example, with reference to FIG. 4, each of cells 402-414 can be assigned a contiguous block of RNTI values according to Table 2 below.

TABLE 2

| Cell | RNTI Value Range (Hex) | RNTI Value Rule |
| --- | --- | --- |
| 402 | 0400-07FF | Sequential ascending |
| 404 | 0800-0BFF | Sequential ascending |
| 406 | 0C00-0FFF | Even values then odd values ascending |
| 408 | 1000-13FF | Odd values then even values ascending |
| 410 | 1400-17FF | Sequential descending |
| 412 | 1800-1BFF | Sequential ascending |
| 414 | 1C00-1F99 | Sequential descending |

The RNTI search space for intercell signals 4140 received at base station 414A in cell 414 could be reduced from all $2^{16}$ (i.e., 65,536) possible values down to 6,143 (1BFF-0400=17FF Hex) potential values, by determining, looking up, or receiving the information in Table 2 for adjacent cells 402-412 (or any cells known to be close enough such that mobile devices can provide intercell signals). As shown in Table 2, each contiguous block can optionally also contain a rule defining the sequence in which values are assigned, which can be taken into consideration. For example, if base station 414A determines an RNTI for mobile device 4128 to be 1905 hex and shortly thereafter another intercell signal is received, SSR 302 can determine from the information in Table 2 that when considering the block of RNTI values assigned to cell 412 (i.e., 1800-1BFF hex) a subset of values above 1905 need only be considered since the rule for cell 412 is sequential ascending values. That is, base station 414A may consider only the next 100 values as opposed to the entire block of 1024 values.

In another aspect, a set of potential coding rates associated with a received intercell signal that is a subset of all available coding rates can be determined by SSR 302. For example, the SSR component 302 can be configured to determine the set of potential coding rates based on a predefined scheme that is based on which cell is associated with the received intercell signal. For example, a scheme can be used for limiting the number of coding rates based on prior scheduling decisions. For example, the scheme can provide that the coding rate can only vary in steps of 1 or 2 from one scheduling decision to the next.

Returning to FIG. 2, in block 204 the signal is processed by a decoder based on a potential combination of a one of the set of RNTIs and a coding rate. Accordingly, a system for determining an RNTI and coding rate for an intercell signal in an LTE communications network includes means for processing, by a decoder, a signal based on a first potential combination of RNTI and coding rate. For example, as illustrated in FIG. 3, a first decoding component 304 can be configured to process the signal based on a first potential combination RNTI and coding rate.

In block 206, based on at least one metric for the processed signal, it is determined whether the potential combination includes a correct RNTI and coding rate combination for the received intercell signal. Accordingly, a system for determining an RNTI and coding rate for an intercell signal in an LTE communications network includes means for determining, based on at least one metric for the processed signal, whether the potential combination includes a correct RNTI and coding rate combination for the received intercell signal. For example, as illustrated in FIG. 3, the signal analyzer component 306 can be configured to determine whether the potential combination includes a correct RNTI and coding rate combination for the received intercell signal. The signal, having been processed through the decoder 304 is provided to the signal analyzer 306 to analyze the results of the processing by the decoder 304. Note that, as used herein, the terms "decoded," "processed by a decoder," "processed through the decoder," and the like, are not intended to imply that the signal was actually correctly decoded. In fact, in accordance with the description herein, there may be many unsuccessful attempts at correctly decoding a signal before the signal is correctly decoded. After each attempt, the processed signal is analyzed by signal analyzer 306.

In an aspect, the at least one metric can include at least one of a cyclic redundancy check (CRC) and a bit error rate (BER) estimate. A CRC passing can provide a near definitive guarantee that the combination of RNTI and coding rate chosen are correct. In another aspect, the at least one metric can include soft information. "Soft" information is information that does not provide a definitive, or near definitive, guarantee but provides an indication of positive results. The decoders may output metrics besides CRC that are soft information such as estimated BER, estimated signal to noise ratio (SNR), log likelihood ratios (LLRs) and extrinsic information. Since a signal using the wrong coding rate and RNTI will likely all look completely unsuccessful in the decoding attempt, the soft information can be used to distinguish between the CRC not passing because the coding rate and RNTI is wrong and the signal having too low a signal to interference plus noise ratio (SINR) to decode. As an example, suppose the BER is estimated as 20% but the CRC does not pass. It is very likely that the correct combination of RNTI and coding rate have been determined, since you would likely get a higher BER otherwise.

Accordingly, in another aspect, determining whether the first potential combination includes a correct RNTI and coding rate combination for the received intercell signal includes signal analyzer 306 determining a result of a CRC, estimating a BER from the decoder, and comparing the estimated BER to a BER threshold. Table 3 below provides exemplary values for CRC and BER, an exemplary value of 40% for a BER threshold, and the determination as to whether the RNTI and coding rate combination is likely correct.

TABLE 3

| CRC | BER | BER Maximum Threshold | RNTI and Coding Rate Correct? |
|---|---|---|---|
| Pass | Any Value | N/A | Yes |
| Fail | 20% | 40% | Yes |
| Fail | 48% | 40% | No |
| Fail | 52% | 40% | No |
| Fail | 35% | 40% | Yes |

In another aspect, the at least one metric can include LLRS. The LLRs give an indication of the confidence that each output bit from the decoder is accurate. It is effectively the same as saying, for bit #1, I am 70% confident that it is a +1, for bit #2, I am 80% confident that it is a −1, etc. If the wrong RNTI and coding rate are chosen then the confidences will be very low.

Returning to FIG. 2, if in block 206 it is determined that the first potential combination does not include the correct RNTI and coding rate combination for the received intercell signal, then in block 208, another potential combination RNTI and coding rate selected and the process returns to block 206 where another signal based on the other potential combination is processed through a decoder. The decoder in this case can be the same decoder as was used for the first signal, or may be a different decoder within system 300. Decoder 304 in FIG. 3 illustrates one or more decoders as shown.

If in block 206 it is determined that the first potential combination includes the correct RNTI and coding rate combination for the received intercell signal, as represented in block 210, then the signal processed by the decoder 304 can be used as the decoded signal. Alternatively, the signal can be processed through another decoding operation to obtain the fully decoded signal. Once the signal is decoded, interference cancellation and/or multiuser detection can be applied to the intercell signal.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. One of ordinary skill in the art should appreciate after learning the teachings related to the claimed subject matter contained in the foregoing description that variations of those preferred embodiments may become apparent to those of ordinary skill in the art upon reading the foregoing description. The inventor intends that the claimed subject matter may be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method for determining a radio network temporary identifier (RNTI) and coding rate for an intercell signal in a long term evolution (LTE) communications network, the method comprising:
   determining a plurality of potential RNTIs associated with a received intercell signal, the plurality of potential RNTIs being a subset of all available RNTIs;
   processing, by a first decoder, a first signal based on a first potential combination of a one of the plurality of RNTIs and a coding rate;
   determining, based on at least one metric for the processed first signal, whether the first potential combination includes a correct RNTI and coding rate combination for the received intercell signal; and
   processing, by a second decoder, a second signal based on a second potential combination of a one of the plurality of RNTIs and a coding rate if the first potential combination does not include the correct RNTI and coding rate combination for the received intercell signal.

2. The method of claim 1 wherein the first decoder and the second decoder are the same decoder.

3. The method of claim 1 wherein determining a plurality of potential RNTIs associated with a received intercell signal includes determining the plurality of RNTIs for mobile devices that are transmitting or requesting bandwidth allocation.

4. The method of claim 3 wherein determining a plurality of RNTIs for mobile devices that are transmitting or requesting bandwidth allocation includes determining, at a base station serving a cell, the plurality of RNTIs for mobile devices that are transmitting to or requesting bandwidth allocation from at least one other base station serving a different cell.

5. The method of claim 4 wherein determining a plurality of RNTIs for mobile devices that are transmitting to or requesting bandwidth allocation from at least one other base station serving a different cell includes determining the plurality of RNTIs for mobile devices that are transmitting to or requesting bandwidth allocation from at least one other base station serving an adjacent cell.

6. The method of claim 4 wherein determining a plurality of RNTIs for mobile devices that are transmitting to or requesting bandwidth allocation from at least one other base station serving a different cell includes receiving information from the at least one other base station serving a different cell, the received information identifying the plurality of RNTIs.

7. The method of claim 1 wherein determining a plurality of potential RNTIs associated with a received intercell signal includes determining the plurality of potential RNTIs based on at least one of a preassigned plurality of potential RNTIs and a sequentially assigned plurality of potential RNTIs.

8. The method of claim 1 comprising determining a plurality of potential coding rates associated with a received intercell signal, the plurality of potential coding rates being a subset of all available coding rates, wherein coding rates used in combination with RNTI are selected from the plurality of potential coding rates.

9. The method of claim 8 wherein determining a plurality of potential coding rates associated with a received intercell signal includes determining the plurality of potential coding rates based on a predefined scheme that is based on which cell is associated with the received intercell signal.

10. The method of claim 1 wherein the at least one metric includes at least one of a cyclic redundancy check (CRC) and a bit error rate (BER) estimate.

11. The method of claim 10 wherein determining, based on at least one metric for the processed first signal, whether the first potential combination includes a correct RNTI and coding rate combination for the received intercell signal includes:
   determining a result of a CRC;
   estimating a BER; and
   comparing the estimated BER to a BER threshold.

12. The method of claim 1 wherein the at least one metric includes soft information.

13. The method of claim 1 wherein the at least one metric includes extrinsic information.

14. A system for determining a RNTI and coding rate for an intercell signal in a LTE communications network, the system comprising:
   means for determining a plurality of potential RNTIs associated with a received intercell signal, the plurality of potential RNTIs being a subset of all available RNTIs;
   means for processing, by a first decoder, a first signal based on a first potential combination of a one of the plurality of RNTIs and a coding rate;
   means for determining, based on at least one metric for the processed first signal, whether the first potential combination includes a correct RNTI and coding rate combination for the received intercell signal; and
   means for processing, by a second decoder, a second signal based on a second potential combination of a one of the plurality of RNTIs and a coding rate if the first potential combination does not include the correct RNTI and coding rate combination for the received intercell signal.

15. A system for determining a RNTI and coding rate for an intercell signal in a LTE communications network, the system comprising system components including:
- an search space reduction component configured for determining a plurality of potential RNTIs associated with a received intercell signal, the plurality of potential RNTIs being a subset of all available RNTIs;
- a first decoding component configured for processing a first signal based on a first potential combination of a one of the plurality of RNTIs and a coding rate;
- a signal analyzer component configured for determining, based on at least one metric for the processed first signal, whether the first potential combination includes a correct RNTI and coding rate combination for the received intercell signal; and
- a second decoding component configured for processing a second signal based on a second potential combination of a one of the plurality of RNTIs and a coding rate if the first potential combination does not include the correct RNTI and coding rate combination for the received intercell signal.

16. The system of claim 15 wherein the first decoder and the second decoder are the same decoder.

17. The system of claim 15 wherein the search space reduction component is configured to determine a plurality of potential RNTIs associated with a received intercell signal by determining the plurality of RNTIs for mobile devices that are transmitting or requesting bandwidth allocation.

18. The system of claim 17 wherein the search space reduction component is configured to determine a plurality of RNTIs for mobile devices that are transmitting or requesting bandwidth allocation by determining, at a base station serving a cell, the plurality of RNTIs for mobile devices that are transmitting to or requesting bandwidth allocation from at least one other base station serving a different cell.

19. The system of claim 18 wherein the search space reduction component is configured to determine a plurality of RNTIs for mobile devices that are transmitting to or requesting bandwidth allocation from at least one other base station serving a different cell by determining the plurality of RNTIs for mobile devices that are transmitting to or requesting bandwidth allocation from at least one other base station serving an adjacent cell.

20. The system of claim 18 wherein the search space reduction component is configured to determine a plurality of RNTIs for mobile devices that are transmitting to or requesting bandwidth allocation from at least one other base station serving a different cell by receiving information from the at least one other base station serving a different cell, the received information identifying the plurality of RNTIs.

21. The system of claim 15 wherein the search space reduction component is configured to determine a plurality of potential RNTIs associated with a received intercell signal by determining the plurality of potential RNTIs based on at least one of a preassigned plurality of potential RNTIs and a sequentially assigned plurality of potential RNTIs.

22. The system of claim 15 wherein the search space reduction component is configured to determine a plurality of potential coding rates associated with a received intercell signal, the plurality of potential coding rates being a subset of all available coding rates, wherein coding rates used in combination with RNTI are selected from the plurality of potential coding rates.

23. The system of claim 22 wherein the search space reduction component is configured to determine a plurality of potential coding rates associated with a received intercell signal by determining the plurality of potential coding rates based on a predefined scheme that is based on which cell is associated with the received intercell signal.

24. The system of claim 15 wherein the at least one metric includes at least one of a CRC and a BER estimate.

25. The system of claim 24 wherein the signal analyzer component is configured to determine whether the first potential combination includes a correct RNTI and coding rate combination for the received intercell signal by:
- determining a result of a CRC;
- estimating a BER; and
- comparing the estimated BER to a BER threshold.

26. The system of claim 15 wherein the at least one metric includes soft information.

27. The system of claim 15 wherein the at least one metric includes extrinsic information.

28. A non-transitory computer readable medium storing a computer program, executable by a machine, for determining an RNTI and coding rate for an intercell signal in a LTE communications network, the computer program comprising executable instructions for:
- determining a plurality of potential RNTIs associated with a received intercell signal, the plurality of potential RNTIs being a subset of all available RNTIs;
- processing, by a first decoder, a first signal based on a first potential combination of a one of the plurality of RNTIs and a coding rate;
- determining, based on at least one metric for the processed first signal, whether the first potential combination includes a correct RNTI and coding rate combination for the received intercell signal; and
- processing, by a second decoder, a second signal based on a second potential combination of a one of the plurality of RNTIs and a coding rate if the first potential combination does not include the correct RNTI and coding rate combination for the received intercell signal.

* * * * *